US012580432B2

(12) United States Patent
Engelhardt

(10) Patent No.: US 12,580,432 B2
(45) Date of Patent: Mar. 17, 2026

(54) ELECTRIC MACHINE AND MOTOR VEHICLE WITH WALL ELEMENT AND TOOTH HEAD RING

(71) Applicant: Dr. Ing. h.c. F. Porsche Aktiengesellschaft, Stuttgart (DE)

(72) Inventor: Tobias Engelhardt, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 252 days.

(21) Appl. No.: 18/475,235

(22) Filed: Sep. 27, 2023

(65) Prior Publication Data

US 2024/0120782 A1    Apr. 11, 2024

(30) Foreign Application Priority Data

Oct. 5, 2022    (DE) ...................... 10 2022 125 595.6

(51) Int. Cl.
H02K 1/20          (2006.01)
H02K 1/16          (2006.01)
          (Continued)

(52) U.S. Cl.
CPC ................ H02K 1/20 (2013.01); H02K 3/24 (2013.01); H02K 5/128 (2013.01); H02K 9/197 (2013.01);
          (Continued)

(58) Field of Classification Search
CPC ...... H02K 9/197; H02K 5/128; H02K 21/025; H02K 21/028; H02K 1/20; H02K 3/24
          (Continued)

(56) References Cited

U.S. PATENT DOCUMENTS 2,153,563 A  *  4/1939  Hubacker .............. H02K 5/128
                                          310/43
2,282,586 A  *  5/1942  Hubacker .............. H02K 5/128
                                          310/86
(Continued)

FOREIGN PATENT DOCUMENTS

CN         115001231 A  *  9/2022  ............. H02K 21/24
DE    102010019318 A1 *  11/2011  ........... H02K 49/043
          (Continued)

*Primary Examiner* — Oluseye Iwarere
*Assistant Examiner* — Daniel K Schlak
(74) *Attorney, Agent, or Firm* — LEYDIG, VOIT & MAYER, LTD.

(57)          ABSTRACT

An electric machine includes a housing, a rotor including a rotor shaft and a rotor laminated core, and a stator including a stator laminated core with grooves in which stator windings are received, through which a coolant can flow, and wherein a respective tooth of the stator laminated core is arranged between two respective grooves arranged adjacent to one another in a circumferential direction. An annular gap is included between the rotor and stator laminated cores and a tooth head ring arranged in the annular gap, a respective recess of the tooth head ring arranged between two tooth heads of the tooth head ring arranged adjacent to one another in a circumferential direction of the tooth head ring. A wall element is arranged in the annular gap and seals the stator against the rotor such that, from the stator via the annular gap, no coolant moves towards the rotor.

12 Claims, 3 Drawing Sheets

(51) Int. Cl.
    *H02K 3/24*     (2006.01)
    *H02K 5/128*     (2006.01)
    *H02K 9/197*     (2006.01)
    *H02K 21/02*     (2006.01)

(52) U.S. Cl.
    CPC ............. *H02K 21/028* (2013.01); *H02K 1/16* (2013.01); *H02K 21/021* (2013.01); *H02K 21/025* (2013.01); *H02K 2209/00* (2013.01)

(58) Field of Classification Search
    USPC .......................................................... 310/86
    See application file for complete search history.

(56)                References Cited

U.S. PATENT DOCUMENTS

| | | | | |
|---|---|---|---|---|
| 2,295,404 | A * | 9/1942 | Johns | H02K 5/128 |
| | | | | 310/86 |
| 2,734,459 | A * | 2/1956 | Zimsky | H02K 5/128 |
| | | | | 417/357 |
| 2,956,188 | A * | 10/1960 | White | F16K 31/04 |
| | | | | 310/86 |
| 2,996,632 | A * | 8/1961 | Ward, Jr. | H02K 5/128 |
| | | | | 310/86 |
| 3,727,085 | A * | 4/1973 | Goetz | H02K 5/128 |
| | | | | 174/DIG. 20 |
| 4,027,229 | A * | 5/1977 | Frink | H02K 21/028 |
| | | | | 322/50 |
| 10,784,738 | B2 | 9/2020 | Berendes et al. | |
| 2002/0084705 | A1 * | 7/2002 | Kawamura | H02K 21/028 |
| | | | | 310/68 R |
| 2003/0193260 | A1 * | 10/2003 | Reiter, Jr. | H02K 1/02 |
| | | | | 310/216.064 |
| 2006/0273682 | A1 * | 12/2006 | Kawamura | H02K 21/14 |
| | | | | 310/191 |
| 2010/0259208 | A1 * | 10/2010 | Hao | H02K 21/028 |
| | | | | 310/154.49 |
| 2013/0162096 | A1 * | 6/2013 | Shimizu | H02K 21/028 |
| | | | | 310/209 |
| 2021/0313868 | A1 | 10/2021 | Hayashi | |
| 2022/0052576 | A1 * | 2/2022 | Knoblauch | H02K 5/10 |
| 2022/0393552 | A1 * | 12/2022 | Berendes | H02K 5/128 |
| 2023/0072165 | A1 * | 3/2023 | Bienaime | H02K 5/128 |

FOREIGN PATENT DOCUMENTS

| | | | | |
|---|---|---|---|---|
| DE | 102013207806 A1 | 10/2014 | | |
| DE | 102014208715 A1 | 11/2015 | | |
| DE | 102016101705 A1 | 8/2017 | | |
| DE | 102017102141 A1 | 8/2018 | | |
| DE | 102018122619 A1 | 6/2019 | | |
| DE | 102019106801 A1 | 9/2020 | | |
| DE | 102019206509 A1 | 11/2020 | | |
| DE | 102019207078 A1 | 11/2020 | | |
| DE | 102020117274 B3 | 9/2021 | | |
| DE | 102020117266 A1 * | 1/2022 | ............ | H02K 5/128 |
| EP | 1035635 A2 * | 9/2000 | ............ | H02K 11/05 |
| FR | 2527858 A1 * | 12/1983 | ............ | H02K 5/128 |
| JP | 2003092899 A * | 3/2003 | ............ | H02P 9/48 |
| JP | 2005184948 A * | 7/2005 | ............ | H02K 21/14 |
| JP | 2007259527 A * | 10/2007 | ............ | H02K 21/14 |
| JP | 2008206275 A * | 9/2008 | ............ | H02P 9/04 |
| JP | 2009011036 A * | 1/2009 | ............ | H02P 9/04 |
| KR | 20080105332 A * | 12/2008 | ............ | H02K 11/30 |
| KR | 20090045660 A * | 5/2009 | ............ | H02K 21/14 |
| WO | WO 2014012549 A2 | 1/2014 | | |

* cited by examiner

ELECTRIC MACHINE AND MOTOR VEHICLE WITH WALL ELEMENT AND TOOTH HEAD RING

CROSS REFERENCE TO RELATED APPLICATIONS

This application claims benefit to German Patent Application No. DE 10 2022 125 595.6, filed on Oct. 5, 2022, which is hereby incorporated by reference herein.

FIELD

The invention relates to an electric machine. The invention further relates to a motor vehicle.

BACKGROUND

The basic design of an electric machine is known from practice. An electric machine has a housing and a stator, which comprises a stator laminated core. The stator is also referred to as the stand. An electric machine also has a rotor, which comprises a rotor shaft and a rotor laminated core. The rotor is also referred to as the runner. The rotor is rotatably mounted in the housing.

DE 10 2019 106 801 A1 and DE 10 2020 117 274 B3 each disclose electric machines having a stator and a rotor. It is disclosed that the stator comprises a stator laminated core, wherein grooves are introduced into the stator lamination, in which stator windings are accommodated. The grooves of the stator laminated core are open radially inwardly, facing the rotor. An annular gap is formed between the rotor and the stator.

In order to be able to operate an electric machine efficiently with a high performance coefficient, a cooling, in particular of the stator windings of the stator, is advantageous. DE 10 2017 102 141 A1 discloses an electric machine around whose stator windings coolant directly flows. The coolant flows through the grooves of the stator laminated core, in which the stator windings are received. In order to prevent the coolant from flowing from the stator into the region of the rotor, a sealing means configured as a sleeve-like wall element is arranged in the annular gap between the stator and the rotor. Such a sleeve-like sealing means is also referred to as a liner or a collimator.

DE 10 2016 101 705 A1, DE 10 2013 207 806 A1, and DE 10 2018 122 619 A1 disclose further electric machines. Electric machines are also known from DE 10 2019 206 509 A1 and DE 10 2019 207 078 A1.

SUMMARY

In an embodiment, the present disclosure provides an electric machine, comprising a housing, a rotor comprising a rotor shaft and a rotor laminated core, and a stator comprising a stator laminated core, wherein the stator laminated core comprises grooves in which stator windings are received, through which a coolant can flow, and wherein a respective tooth of the stator laminated core is arranged between two respective grooves that are arranged adjacent to one another in a circumferential direction. The electric machine further comprises an annular gap formed between the rotor laminated core and the stator laminated core and a tooth head ring arranged in the annular gap, a respective recess of the tooth head ring being arranged between two tooth heads of the tooth head ring that are arranged adjacent to one another in a circumferential direction of the tooth head ring. The electric machine further comprises a wall element arranged in the annular gap between the tooth head ring and the stator laminated core, wherein the wall element seals the stator against the rotor such that, proceeding from the stator via the annular gap and the tooth head ring, no coolant moves towards the rotor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
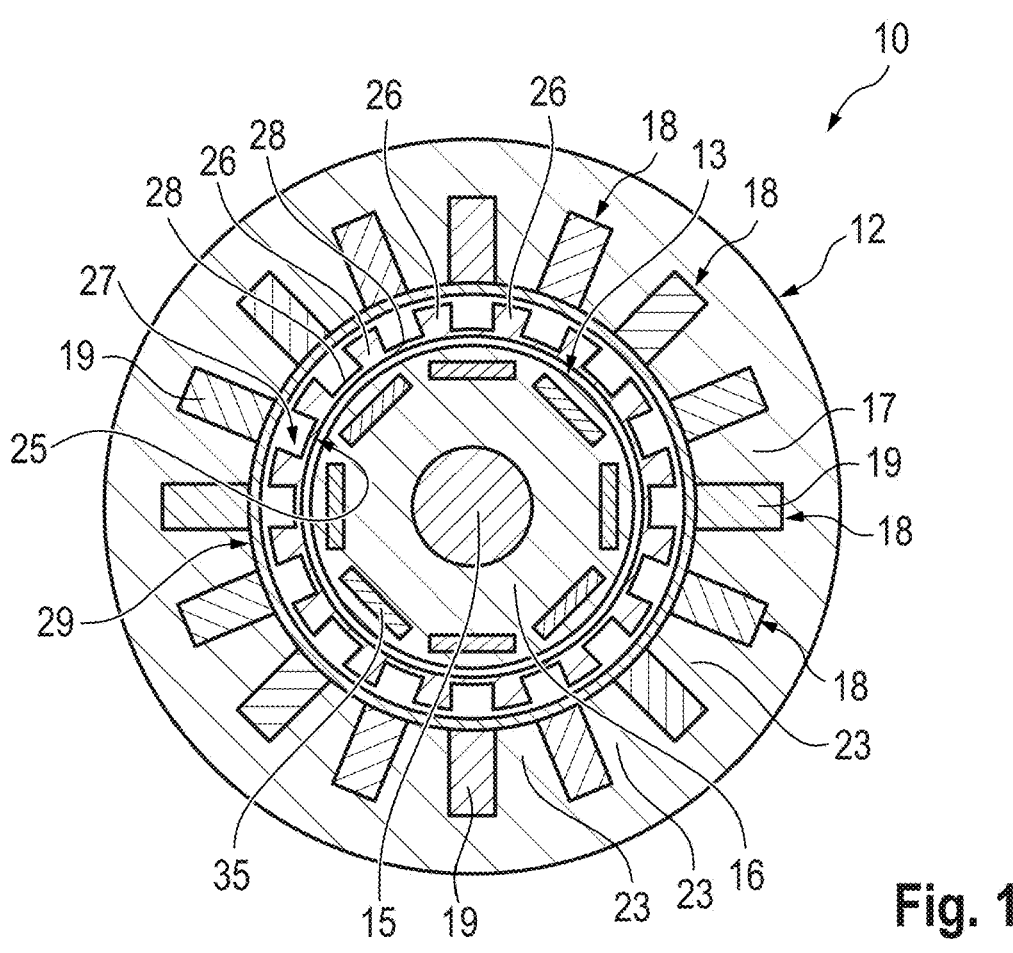
FIG. 1 illustrates a schematic cross-section in a radial cut direction through a first electric machine according to an embodiment of the invention in a first state thereof.

There is a need for an electric machine that can be operated efficiently and thus with a high performance coefficient, which preferably serves as a drivetrain assembly of a motor vehicle. The problem addressed by embodiments of the invention create a corresponding electric machine and a motor vehicle.

According to an embodiment of the invention, a tooth head ring is arranged in the annular gap, a respective recess of the tooth head ring is arranged between two tooth heads that are arranged adjacent to one another in the circumferential direction of the tooth head ring.

According to an embodiment of the invention, a wall element is further arranged in the annular gap, namely between the tooth head ring and the stator laminated core, wherein the wall element seals the stator against the rotor such that, proceeding from the stator via the annular gap and the tooth head ring, no coolant moves towards the rotor.

Via the tooth head ring arranged in the annular gap of the electric machine and arranged between the sleeve-like wall element and the rotor, the sleeve-like wall element can be radially supported inwardly. There is then no risk that the latter will undesirably deform as a result of a coolant pressure and that coolant will leak in the direction of the rotor.

Furthermore, the magnetic flux can be optimally guided using the tooth head ring arranged in the annular gap of the electric machine in order to minimize losses in the stator. As a result, it is ultimately possible to operate an electric machine efficiently and thus with a high performance coefficient.

Preferably, via a relative movement between the stator laminated core of the electric machine and the tooth head ring of the electric machine, the relative position of the stator laminated core and the tooth head ring is adjustable such that, in a first relative position of the stator laminated core and the tooth head ring, the tooth heads of the tooth head ring radially inwardly abut the teeth of the stator laminated core, and, in a second relative position of the stator laminated core and the tooth head ring, the tooth heads radially inwardly abut the grooves of the stator laminated core, in each case having a wall element positioned therebetween. Then, when the relative position of the stator laminated core and the tooth head ring is adjustable, a particularly efficient operation of the electric machine at different operating points and load conditions of the electric machine is possible.

The first relative position of the stator laminated core and the tooth head ring of the electric machine is used in particular for a full-load operation of the electric machine in order to allow for the greatest possible electromagnetic flux, so that the electric machine can provide a maximum torque.

The second relative position of the stator laminated core and the tooth head ring of the electric machine is used in particular for a partial-load operation of the electric machine in order to reduce the direction of the electromagnetic flux and to reduce losses, in particular so-called intrinsic losses, in the stator and thus also to enable efficient operation with a high performance coefficient in the partial-load operation.

Preferably, the electric machine comprises an actuator configured so as to transition the stator laminated core or tooth head ring from the first relative position into the second relative position and from the second relative position into the first relative position. The relative position between the stator laminated core and the tooth head ring of the electric machine can be particularly advantageously changed or adjusted via an actuator of the electric machine.

According to a first embodiment of the invention, the wall element is configured so as to be fixed in place, as is the stator laminated core and the housing, wherein the tooth head ring is configured so as to be rotatable relative to the stator laminated core and relative to the wall element in the circumferential direction of the tooth head ring. According to a second embodiment of the invention, the wall element is configured so as to be fixed in place, as is the tooth head ring and the housing, wherein the stator laminated core is configured so as to be rotatable relative to the tooth head ring and relative to the wall element in the circumferential direction of the stator laminated core. In both embodiments, the wall element, as well as the housing, is configured so as to be fixed in place and sealed against the housing. In the first embodiment of the invention, the tooth head ring is rotatable relative to the fixed stator laminated core and, in the second embodiment of the invention, the stator laminated core is rotatable in a circumferential direction relative to the fixed tooth head ring in order to adjust the relative position between the stator laminated core and the tooth head ring of the electric machine. Both embodiments allow for an efficient operation of an electric machine with a high performance coefficient.

Preferably, in the second embodiment of the invention, the wall element is applied radially outwardly onto the tooth head ring and fixedly connected thereto. In the second embodiment of the invention, the wall element can be fixedly connected to the tooth head ring and can thus be integrated into the tooth head ring. In this case, there is then no gap between the tooth head ring and the wall element, so that the tooth head ring can optimally support the wall element.

In the first embodiment of the invention, a small air gap is formed between the tooth head ring and the wall element in order to be able to displace the tooth head ring relative to the wall element. In this embodiment, however, the tooth head ring can also protect the wall element against impermissibly high deformation by radially inner support.

A motor vehicle according to an embodiment of the invention is provided.

Embodiments of the invention emerge from the following description. Without being restricted thereto, embodiments of the invention will be explained in greater detail with reference to the drawings.

Figure 2:
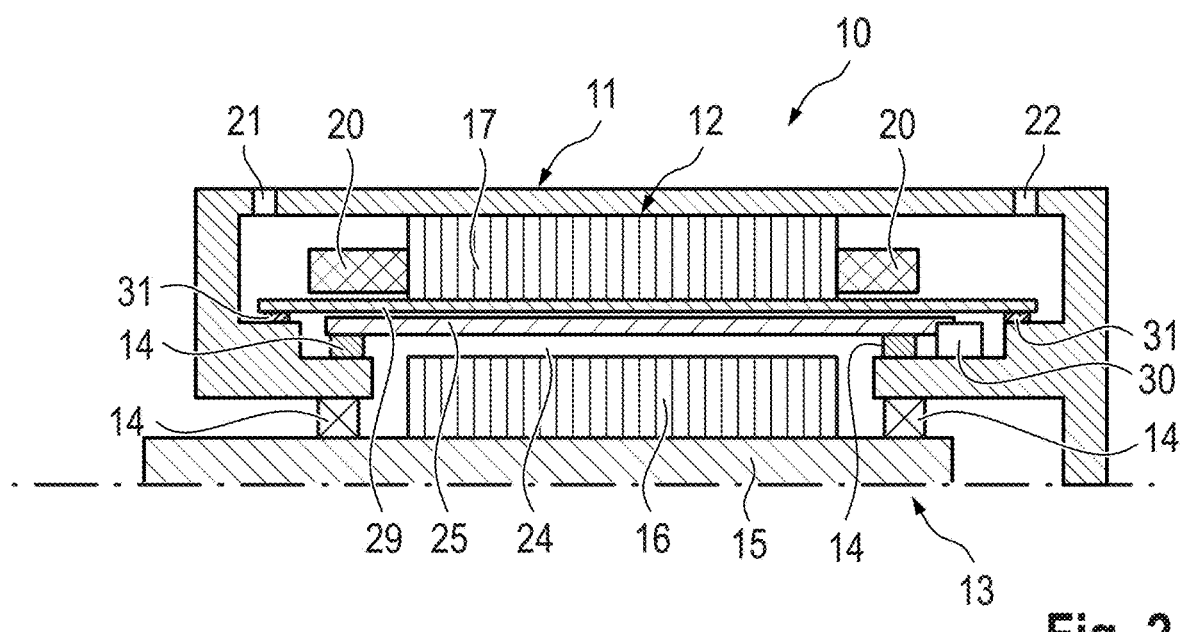
FIG. 2 illustrates a schematic cross-section in an axial cut direction through the first electric machine according to an embodiment of the invention.

FIGS. 1 and 2 show different views of an electric machine 10 according to an embodiment of the present invention. The electric machine 10 has a housing 11, a stator 12, and a rotor 13. The stator 12 is also referred to as the stand, and the rotor 13 is also referred to as the runner.

The rotor 13 is rotatably supported in the housing 11 via bearings 14. Thus, FIG. 2 shows a rotor shaft 15 that is rotatably supported in the housing 11 via the bearings 14. The rotor shaft 15 supports a rotor laminated core 16.

The stator 12 comprises a stator laminated core 17. Grooves 18 are introduced into the stator laminated core 17, wherein stator windings 19 are arranged in the grooves 18 of the stator laminated core 17. The stator windings 19 project from the stator laminated core 12 at axial ends of the stator laminated core 12 and form winding heads 20 there.

The grooves 18 of the stator laminated core 12 are perfused by coolant such that the stator windings 19 received in the grooves 18 are directly surrounded by coolant. The winding heads 20 are also directly surrounded by coolant. In FIG. 2, a coolant inlet 21 and a coolant outlet 22 of the housing 11 are shown, via which coolant can be supplied for cooling of the stator 12 and then discharged.

Between circumferentially adjacent grooves 18 of the stator laminated core 17, the stator laminated core 17 forms teeth 23. Between two circumferentially adjacent teeth 23, a respective groove 18 is configured so as to receive the stator windings 19, around which coolant directly flows.

An annular gap 24 is formed between the stator 12 and the rotor 13 of the electric machine 10, namely between the stator laminated core 12 and the rotor laminated core 16. A tooth head ring 25 is arranged in the annular gap 24.

The head ring 25 has a plurality of tooth heads 26 arranged side-by-side in the circumferential direction of the head ring, wherein a recess 27 of the tooth head ring 25 is formed between two respective circumferentially distanced tooth heads 26 of the head ring 25. In the region of these recesses 27, the tooth heads 26 are connected to one another by webs 28.

In the exemplary embodiment shown, the recesses 27 of the tooth head ring 25 are open radially outwardly towards the stator laminated core 17. The webs 28 thereof, which connect the tooth heads 26, are then positioned radially inwardly. By contrast, it is also possible for the recesses 27 of the tooth head ring 25 to open radially inwardly towards the rotor laminated core 16, in which case the webs 28 would then be arranged radially outwards for connecting the tooth heads 26.

In the annular gap 24, not only the tooth head ring 25 is arranged, but rather also a wall element 29. This wall element 29 is arranged between the tooth head ring 25 and the stator laminated core 17 of the stator 12 and is preferably shaped like a sleeve in the form of a liner or also a collimator. The wall element 29 seals the stator 12 against the rotor 13 and ensures that no coolant moves towards the rotor 13 proceeding from the stator 12 via the annular gap 24 and via the tooth head ring 25. The wall element 29 therefore seals the rotor 13 against the stator 12 in order to prevent coolant from entering the region of the rotor 13.

Via the tooth head ring 25, the magnetic flux can be optimally guided during operation of the electric machine 10 in order to efficiently operate the electric machine 10 with a high performance coefficient. Furthermore, the tooth head ring 25 can support the wall element 29 radially inwardly and can prevent an impermissibly large deformation of the wall element 29. Leaks in the wall element 29 can thus be prevented. Overall, it is possible to efficiently operate an electric machine 10 with a high performance coefficient.

According to an advantageous embodiment of the invention, via a relative movement between the stator laminated core 17 and the tooth head ring 25, the relative position of the stator laminated core 17 and the tooth head ring 25 is adjustable such that, in a first relative position of the stator laminated core 17 and the tooth head ring 25, the tooth heads 26 of the tooth head ring 25 radially inwardly abut the teeth 23 of the stator laminated core 17, namely with the wall element 29 positioned therebetween. This relative position is shown in FIG. 1. By means of a relative movement between the stator laminated core 17 and the tooth head ring 25 in the circumferential direction of the stator laminated core 17 and thus the tooth head ring 25, a second relative position of the stator laminated core 17 and the tooth head ring 25 can also be adjusted, in which the tooth heads 26 radially inwardly abut the grooves 18 of the stator laminated core 17 and thus the stator windings 19 received in the grooves 18, namely with the wall element 29 positioned therebetween.

The first relative position of the stator laminated core 17 and the tooth head ring 25 is particularly advantageous for full-load operation of the electric machine 10 in order to provide a maximum magnetic flux so that the electric machine can ultimately generate a maximum torque. The second relative position of the stator laminated core 17 and the tooth head ring 25 is particularly advantageous for partial-load operation in order to adjust an air gap with higher efficiency, thereby reducing the guidance of the magnetic flux and reducing losses, in particular intrinsic losses, in the stator 12 in the partial-load operation. Finally, an electric machine 10 can be efficiently operated with a high performance coefficient both in full-load operation and in partial-load operation.

In the exemplary embodiment of FIGS. 1 and 2, the wall element 29 as well as the stator laminated core 17 and the housing 11 are configured so as to be fixed in place. The tooth head ring 25 can be rotated relative to the stator laminated core 17 and relative to the wall element 29 in the circumferential direction of the tooth head ring 25 in order to change the relative position between the tooth head ring 25 and the stator laminated core 17. For example, FIG. 2 shows bearings 29 via which the tooth head ring 25 is rotatably supported in the housing 11 of the electric machine 10.

An actuator 30 is used in order to rotate the tooth head ring 25 in the circumferential direction thereof. This actuator 30 can be an actuator that actively twists the tooth head ring 25 in the circumferential direction in relation to the stator laminated core 12 in order to transfer the latter from the first relative position into the second relative position and vice versa from the second relative position into the first relative position.

In the exemplary embodiment of FIGS. 1 and 2, a small gap is formed between the tooth head ring 25 and the wall element 29, so that the tooth head ring 25 can freely rotate without contact to the wall element 29.

If, however, the wall element 29 is subjected to deformation as a result of impermissibly high coolant pressures, the tooth head ring 25 can radially inwardly support the wall element and protect it against impermissibly large deformation.

The wall element 29, which can be configured as a liner or a collimator, is sealed against the housing 11. For example, FIG. 2 shows that sealing elements 31 are arranged at axial ends of the wall element 29 between the housing 11 and the wall element 29.

Figure 3:
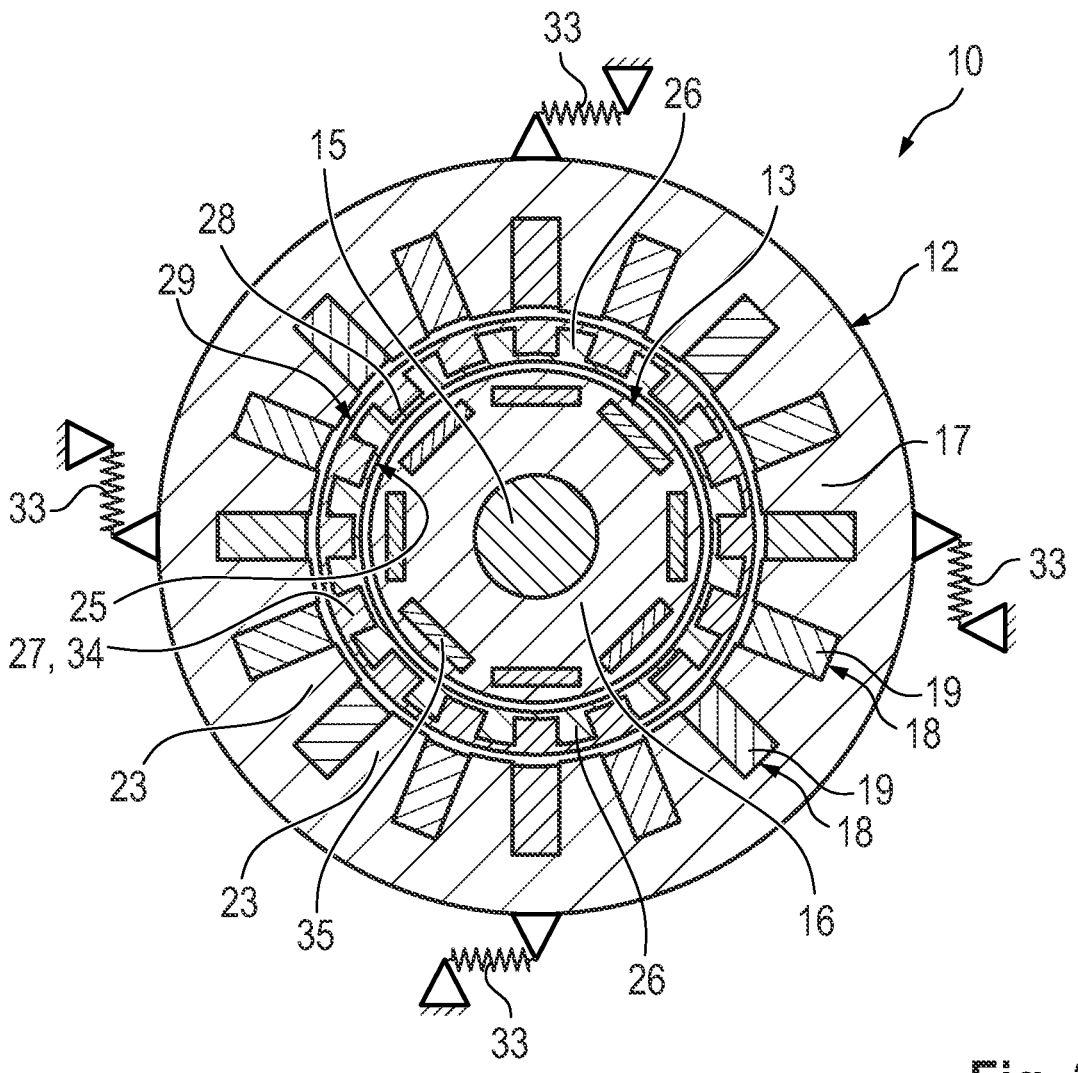
FIG. 3 illustrates a schematic cross-section in a radial cut direction through a second electric machine according to an embodiment of the invention in a first state thereof.
Figure 4:
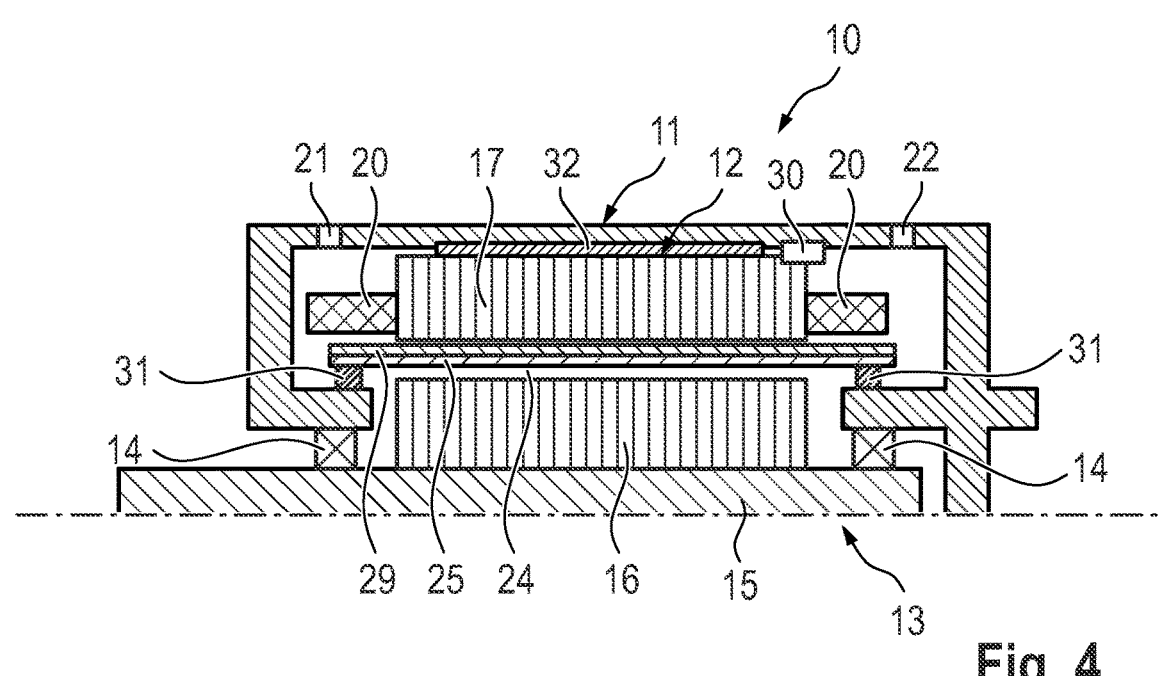
FIG. 4 illustrates a schematic cross-section in an axial cut direction through the second electric machine according to an embodiment of the invention.
Figure 5:
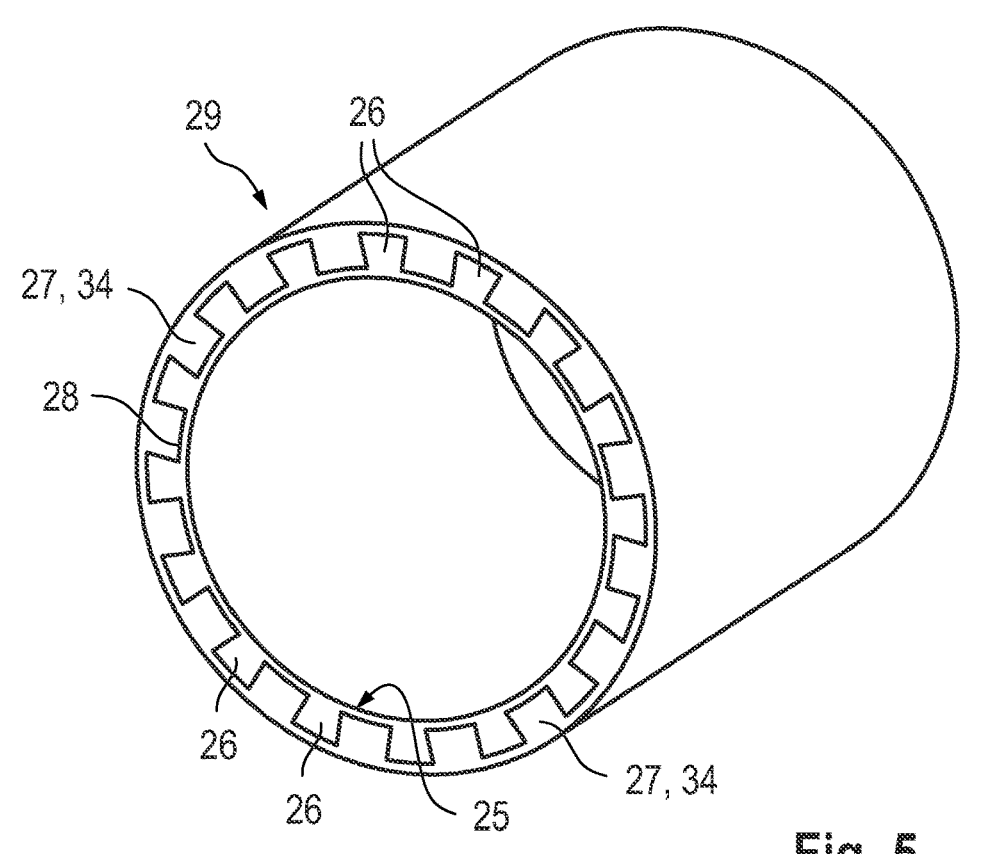
FIG. 5 illustrates a perspective view of a detail of the second electric machine according to an embodiment of the present invention.

FIGS. 3, 4, and 5 show details of a second exemplary embodiment of an electric machine 10, wherein the same reference numerals are used for the same assemblies in order to avoid unnecessary repetitions, and reference is made to the embodiments of the exemplary embodiment of FIGS. 1 and 2. The only detailed descriptions below will be for aspects in which the electric machine 10 of FIGS. 3 to 5 differs from the electric machine 10 of FIGS. 1 and 2.

While in FIGS. 1, 2, the stator 12 is fixed and the tooth head ring 25 is configured so as to be rotatable in the circumferential direction, in the exemplary embodiment of FIGS. 3 to 5 it is provided that the tooth head ring 25 is fixed and the stator laminated core 17 is rotatable in the circumferential direction relative to the stator laminated core 12 in order to adjust the relative position between the stator laminated core 17 and the tooth head ring 25. For this purpose, the stator 12, namely the stator laminated core 17, is rotatably supported in the housing 11 of the electric machine 10 via a bearing 32, wherein the rotation of the stator laminated core 12 in the circumferential direction thereof is in turn provided by an actuator 30. Accordingly, in the exemplary embodiment of FIGS. 3, 4, and 5, the wall element 29 as well as the tooth head ring 25 and the housing 11 are configured so as to be fixed in place, and the stator laminated core 17 is configured so as to be rotatable relative to the tooth head ring 25 and relative to the wall element 29 in the circumferential direction of the stator laminated core 17.

In FIG. 3, the actuator 30 comprises spring elements 33 configured as resetting elements that automatically push the stator laminated core 17 of the stator 12 into a relative position. From this relative position, the stator laminated core 17 can then be transferred to the respective other relative position in the circumferential direction of the latter counter to the resetting force of the resetting elements, in particular counter to the spring force of the spring elements.

Preferably, the spring elements 33 push the stator laminated core 17 into the second relative position. In this second relative position, the tooth heads 26 of the tooth head ring 25 radially abut the grooves 18 or the stator windings 19 of the stator 12 received in the grooves 18, namely with the wall element 29 positioned therebetween. Out of this second relative position, the stator laminated core 17 of the stator 12 can be transferred to the first relative position counter to the spring forces of the spring elements 33, namely either actively via an actuator or passively by exploiting electromagnetic forces that build up during operation of the electric machine or torques of the electric machine 10 to be supported.

For example, the spring elements 33 can be sized such that they automatically push the stator laminated core 17 into the second relative position, up to a certain threshold value. If the torque supplied and to be supported by the electric machine is greater than the determined threshold value, the stator laminated core 17 is automatically transferred into the first relative position, counter to the spring forces of the spring elements 33. A hysteresis can be adjusted via friction elements for a spring characteristic curve of the spring elements 33 in order to avoid a frequent transfer back and forth between the first relative position and the second relative position.

Also in the exemplary embodiment of FIGS. 3, 4, and 5, the wall element 29 is arranged between the tooth head ring 25 and the stator laminated core 17 in the annular gap 24 between the stator laminated core 17 and the rotor laminated core 16, wherein, however, in the exemplary embodiment of FIGS. 3, 4, and 5, no air gap is required between the wall element 29 and the tooth head ring 25.

Rather, in the exemplary embodiment of FIGS. 3, 4, and 5, it is provided that the wall element 29 is directly applied radially outwardly on the tooth head ring 25 and is fixedly connected thereto. As can in particular be seen in FIGS. 3 and 4, projections 34 of the wall element 29 extend into the recesses 27 of the tooth head ring 25. The tooth head ring 25 and wall element 29 thus form an integral assembly.

The tooth head ring 25 is preferably made from a laminated core of electric sheets and accordingly made of a metallic material. The wall element 29 is made of a plastic, for example a fiber-reinforced plastic.

Also in the exemplary embodiment of FIGS. 3, 4, and 5, it is possible that, by contrast to the exemplary embodiment shown, the recesses 27 of the tooth head ring 25 do not open radially outwards but rather radially inwards. In this case, however, the wall element 29 radially outwardly abuts the tooth head ring 25.

The electric machine 10 according to an embodiment of the invention uses a direct cooling of the stator windings 19 received in the grooves 18 of the stator laminated core 17 as well as the winding heads 20, which are formed on both sides of the stator laminated core 17. Heat can thus be optimally dissipated from the stator windings 19. The wall element 29 prevents the coolant from entering the region of the rotor 13.

Between the rotor 13 and the wall element 29, i.e., radially inwardly abutting the wall element 29, the tooth head ring 25 is positioned, which can protect the wall element 29 against impermissibly large deformations and via which the magnetic flux can be optimally guided in the operation of the electric machine.

In particular, via a change in the relative position between the tooth head ring 25 and the stator laminated core 17, the magnetic flux can be optimally adjusted to the load point of the electric machine 10 in order to minimize losses and increase the efficiency and thus the performance coefficient of the electric machine.

In the exemplary embodiments shown, magnets 35 are arranged in recesses of the rotor laminated core 16. In the case of a permanently stimulated synchronous machine, the magnets 35 are permanent magnets. However, in the recesses of the rotor laminated core 16 of the rotor 13, geometries generating a reluctance, rotor windings, or short-circuited cages made of copper or aluminum can also be provided in other designs.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric machine, comprising:
   a housing;
   a rotor comprising a rotor shaft and a rotor laminated core;
   a stator comprising a stator laminated core, wherein the stator laminated core comprises grooves in which stator windings are received, through which a coolant can flow, and wherein a respective tooth of the stator laminated core is arranged between two respective grooves that are arranged adjacent to one another in a circumferential direction;
   an annular gap formed between the rotor laminated core and the stator laminated core;
   a tooth head ring arranged in the annular gap, a respective recess of the tooth head ring being arranged between two tooth heads of the tooth head ring that are arranged adjacent to one another in a circumferential direction of the tooth head ring; and
   a wall element arranged in the annular gap between the tooth head ring and the stator laminated core, wherein the wall element seals the stator against the rotor such that, proceeding from the stator via the annular gap and the tooth head ring, no coolant moves towards the rotor.

2. The electric machine according to claim 1, wherein a relative movement between the stator laminated core and the tooth head ring and a relative position of the stator laminated core and the tooth head ring is adjustable such that, in a first relative position of the stator laminated core and the tooth head ring, the tooth heads of the tooth head ring radially inwardly abut the teeth of the stator laminated core, and, in a second relative position of the stator laminated core and the tooth head ring, the tooth heads radially inwardly abut the grooves of the stator laminated core, in each case having a wall element positioned therebetween.

3. The electric machine according to claim 2, wherein an actuator is configured to transition the stator laminated core or tooth head ring from the first relative position into the second relative position and from the second relative position into the first relative position.

4. The electric machine according to claim 2, wherein:
   the wall element as well as the stator laminated core and the housing are configured to be fixed in place, and
   the tooth head ring is rotatably configured relative to the stator laminated core and relative to the wall element in the circumferential direction of the tooth head ring.

5. The electric machine according to claim 2, wherein:
   the wall element as well as the tooth head ring and the housing are configured to be fixed in place, and the stator laminated core is rotatably configured relative to the tooth head ring and relative to the wall element in the circumferential direction of the stator laminated core.

6. The electric machine according to claim 5, wherein the wall element is radially outwardly applied to and fixedly connected to the tooth head ring.

7. The electric machine according to claim 5, wherein the recesses of the tooth head ring are open radially outwardly towards the stator laminated core, and the wall element extends with protrusions into the recesses of the tooth head ring.

8. The electric machine according to claim 1, wherein the wall element is sealed against the housing.

9. The electric machine according to claim 1, wherein sealing elements are arranged between axial ends of the wall element, with which axial ends the sealing elements protrude in relation to axial ends of the stator laminated core, and the housing.

10. A hybrid vehicle or an electric vehicle having the electric machine according to claim 1 serving a drivetrain assembly.

11. The electric machine according to claim 1, wherein a portion of the housing is arranged radially inward of the tooth head ring and the wall element.

12. The electric machine according to claim 1, wherein the tooth head ring contacts the wall element on a radially inward side of the wall element.

\* \* \* \* \*